United States Patent
Thomas (10) Patent No.: US 9,346,604 B2
(45) Date of Patent: May 24, 2016

(54) METHOD, KIT, AND CONTAINER FOR PREPARING A SNACK FOOD

(75) Inventor: Haley Thomas, Tiffin, OH (US)

(73) Assignee: BALLEREICH BROS., INC., Tiffin, OH (US)

( * ) Notice: Subject to any disclaimer, the term of this patent is extended or adjusted under 35 U.S.C. 154(b) by 415 days.

(21) Appl. No.: 13/423,596

(22) Filed: Mar. 19, 2012

(65) Prior Publication Data

US 2013/0078338 A1 Mar. 28, 2013

Related U.S. Application Data (60) Provisional application No. 61/539,521, filed on Sep. 27, 2011.

(51) Int. Cl.

| | | |
|---|---|---|
| *B65D 81/34* | (2006.01) | |
| *A23L 1/10* | (2006.01) | |
| *A23L 1/18* | (2006.01) | |
| *A23L 1/217* | (2006.01) | |

(Continued)

(52) U.S. Cl.
CPC .............. *B65D 81/3453* (2013.01); *A23L 1/10* (2013.01); *A23L 1/164* (2013.01); *A23L 1/18* (2013.01); *A23L 1/217* (2013.01); *A23L 1/221* (2013.01); *A23P 1/082* (2013.01); *B65D 5/16* (2013.01); *B65D 77/02* (2013.01); *B65D 81/343* (2013.01); *B65D 2577/042* (2013.01)

(58) Field of Classification Search
CPC .................................................. B65D 81/3453
USPC ........................... 426/89, 107, 113, 114, 120
See application file for complete search history.

(56) References Cited

U.S. PATENT DOCUMENTS

| | | | | | |
|---|---|---|---|---|---|
| 2,800,268 | A | * | 7/1957 | Mathews | ........... B65D 5/46192 229/112 |
| 3,586,512 | A | | 6/1971 | Mancuso et al. | |

(Continued)

FOREIGN PATENT DOCUMENTS

WO    WO 0061456 A2 * 10/2000 ............. B65D 81/34

OTHER PUBLICATIONS

Guttormsen, et al. "Current Practice in Potato Processing Waste Treatment". Water Pollution Control Research Series, DAST-14. Oct. 1969. Federal Water Pollution Control Administration. pp. 1-118.*

(Continued)

*Primary Examiner* — Jenna A Watts
(74) *Attorney, Agent, or Firm* — Fraser Clemens Martin & Miller LLC; Jacob M. Ward (57) ABSTRACT

A method for preparing a custom flavored snack food includes the provision of a quantity of a snack food that is at least partially cooked and at least one seasoning powder. The snack food is placed in a coating container with the at least one seasoning powder. The snack food is then coated with the at least one seasoning powder. The snack food coated with the at least one seasoning powder is subsequently heated to a predetermined temperature for a predetermined time to form the custom flavored snack food. The method may be practiced with a kit having the snack food, the at least one seasoning powder, the coating container, and the heating container. The heating container may have a removable panel that, when removed, provides access to a heating cavity for receiving and heating the coated snack food to form the custom flavored snack food.

13 Claims, 8 Drawing Sheets (51) Int. Cl.
  *A23L 1/221* (2006.01)
  *A23L 1/164* (2006.01)
  *A23P 1/08* (2006.01)
  *B65D 77/02* (2006.01)
  *B65D 5/16* (2006.01)

(56) References Cited

U.S. PATENT DOCUMENTS

| | | | |
|---|---|---|---|
| 4,218,485 | A | 8/1980 | Lee et al. |
| 5,298,268 | A | 3/1994 | Maegli |
| 8,231,925 | B2 | 7/2012 | Ganesan et al. |
| 2004/0035859 | A1 | 2/2004 | Childress et al. |
| 2006/0019001 | A1 | 1/2006 | Levinson |
| 2007/0237863 | A1* | 10/2007 | Langen .................. 426/107 |
| 2007/0292593 | A1 | 12/2007 | Ganesan et al. |
| 2009/0274799 | A1 | 11/2009 | Lee et al. |
| 2011/0091614 | A1 | 4/2011 | Malone et al. |
| 2011/0174870 | A1 | 7/2011 | Owensby et al. |

OTHER PUBLICATIONS

Serkoff, Vera. "Paper Bag Cookery". Published by C. Arthur Pearson LTD, London, 1911. pp. 1-69.*
"Wok Skills 101: How to Deep Fry at Home". Available online as of Jun. 29, 2010 from www.seriouseats.com. pp. 1-10.*
"The Case of the King's Fries". Comfort Food Innovations. Available online as of Feb. 17, 2010. pp. 1-4.*
"Homemade French Fry Seasoning blend recipe". Examiner.com. Available online as of Aug. 16, 2010. pp. 1-2.*
Instructables, How to Make Delicious, Healthy Homemade Potato Chips With a Microwavel, website, http://www.instructables.com/id/How-to-Make-Delicious-Healthy-Homemade-Potato-Chi/.

* cited by examiner

METHOD, KIT, AND CONTAINER FOR PREPARING A SNACK FOOD

CROSS-REFERENCE TO RELATED APPLICATIONS

This application claims the benefit of U.S. Provisional Application No. 61/539,521, filed on Sep. 27, 2011. The entire disclosure of the above application is hereby incorporated herein by reference.

FIELD OF THE INVENTION

The present invention relates generally to snack foods and, more particularly, to methods for preparing custom flavored snack foods.

BACKGROUND OF THE INVENTION

The snack food industry is highly innovative. A variety of methods are known in the art for preparing snack foods such as potato chips, pretzels, crackers, and the like. For example, conventional potato chips are prepared by the basic steps of peeling and slicing raw potatoes, washing the raw potato slices to remove surface starches, and frying the potato slices in hot oil until a desired moisture content and crispness is achieved. The fried potato slices are then salted or seasoned and packaged for sale to a consumer.

Heretofore, snack foods have generally been pre-seasoned prior to packaging and sale to the consumer. The consumer has not had an opportunity to customize the flavoring of the snack to the consumer's specific tastes. It is also known that snack foods consumed warm and fresh immediately after production have a unique savory flavor that the consumer enjoys. In fact, the consumption of warm and fresh snack foods is often a highlight when one tours through a production facility in the snack food industry.

There is a continuing need for a method, kit, and container for preparing heated and flavored snack foods. Desirably, the method, kit, and container permit a consumer to customize seasoning of the snack food, and create a unique experience by which the consumer can recreate or simulate a taste of the snack food when provided warm and fresh immediately after production.

SUMMARY OF THE INVENTION

In concordance with the instant disclosure, a method, kit, and container for preparing heated and flavored snack foods, which permit a consumer to customize seasoning of the snack food, and create a unique experience by which the consumer can recreate or simulate a taste of the snack food when provided warm and fresh immediately after production, is surprisingly discovered.

In one embodiment, a method for preparing a custom flavored snack food includes the step of providing a quantity of a snack food that is at least partially cooked and at least one seasoning powder. The snack food is placed in a coating container with the at least one seasoning powder. The snack food is coated with the at least one seasoning powder. The snack food coated with the at least one seasoning powder is then heated to a predetermined temperature for a predetermined time to form the custom flavored snack food.

In a further embodiment, a kit for preparing a custom flavored snack food includes a quantity of a snack food that is at least partially cooked, at least one package of at least one seasoning powder, a coating container, and a heating container. The coating container is provided for manually coating the snack food with the at least one seasoning powder. The heating container is configured to hold the snack food, the at least one package of seasoning powder, and the coating container. The heating container is also configured to receive the snack food coated with the at least one seasoning powder, for the purpose of heating the snack food coated with the at least one seasoning powder to a predetermined temperature for a predetermined time to form the custom flavored snack food.

In another embodiment, a heating container for preparing a custom flavored snack food includes a main body with a handle disposed at a top of the main body. The main body also has a removable panel disposed on one of a front and a rear of the main body. When removed, the removable panel provides access to a heating cavity of the heating container for receiving a snack food coated with an at least one seasoning powder. The main body is at least one of microwaveable and oven-safe in order to heat the snack food coated with the at least one seasoning powder to a predetermined temperature for a predetermined time to form the custom flavored snack food.

In an illustrative embodiment, a method for preparing flavored potato chips includes the steps of: providing a quantity of at least partially cooked potato chips and a seasoning powder; placing the chips in a container with the seasoning powder; manually shaking the container; and heating the chips at a predetermined time and temperature to form custom flavored potato chips. The custom flavored potato chips are served hot. The potato chips are preferably marcelled to provide both a structural integrity during the manual shaking and an optimum level of coating with the seasoning powder during the manual shaking of the container. Multiple seasonings may be used to provide designer flavors. The heating may be performed in either a conventional oven or in a microwave oven. The powder seasoning is at least partially absorbed by the potato chips so that the potato chips take on the flavor of the seasoning. The oil type and content of the potato chips is controlled so that the custom flavor potato chips are hot and crispy, and will absorb the flavor of the seasoning powder. The final hot custom flavor potato chips product tastes similar to potato chips that are provided directly from a production line at a potato chip factory. The disclosure also includes custom flavored potato chips produced by the method. A kit comprising a quantity of potato chips, at least one package of at least one seasoning powder for flavoring, and at least one coating container is also provided. The container may include one of a bag and a box, as nonlimiting examples.

In another illustrative embodiment, the disclosure includes a "cook in the box" feature to add to the ease of consumer use. With this feature, a paperboard heating container is able to be opened via a perforation on the front or rear of the heating container, and the heating container is manufactured in a way suitable for microwave cooking. After being seasoned in the bag, the potato chips are placed directly in the opened paperboard heating container. The heating container is then placed in a microwave oven for cooking. This feature eliminates a need for a separate cooking dish, saving the consumer time in preparation and clean-up. Alternatively, the heating container may include a microwavable tray, which the consumer may construct by inserting tabs into precut slots, in lieu of the microwavable perforated heating container.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

The following description is merely exemplary in nature and is not intended to limit the present disclosure, application, or uses. It should be understood that throughout the drawings, corresponding reference numerals also indicate like or corresponding parts and features. In respect of the methods disclosed, the order of the steps presented is exemplary in nature, and thus, is not necessary or critical.

Figure 1:
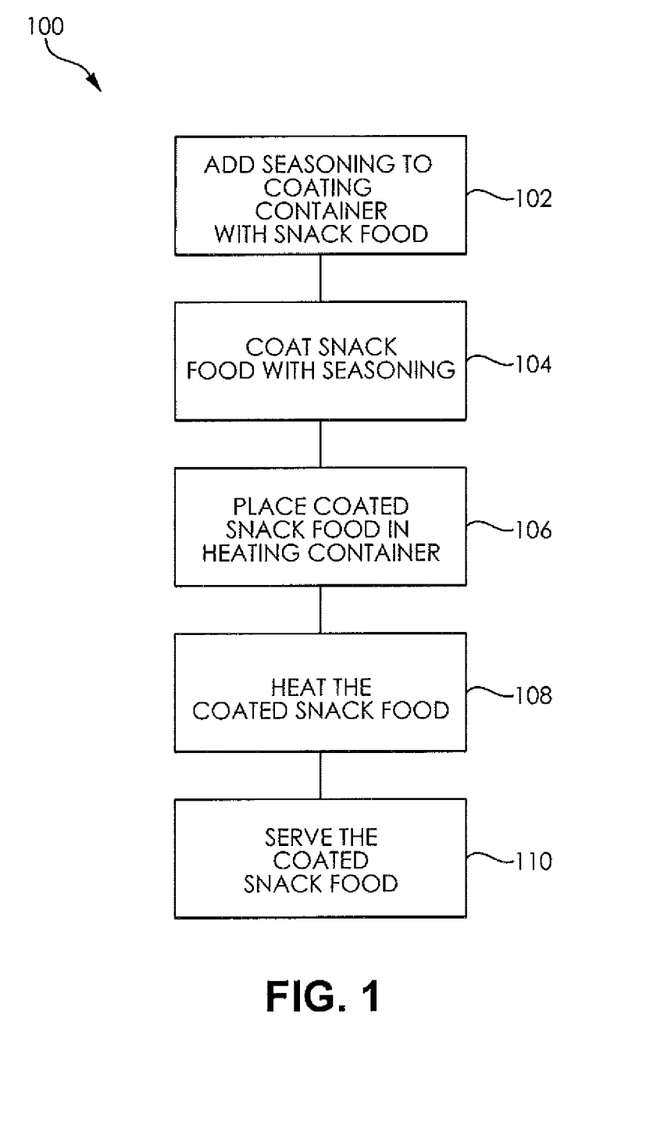
FIG. 1 is a flow diagram of a method for preparing a custom flavored snack food according to one embodiment of the present disclosure.
Figure 2:
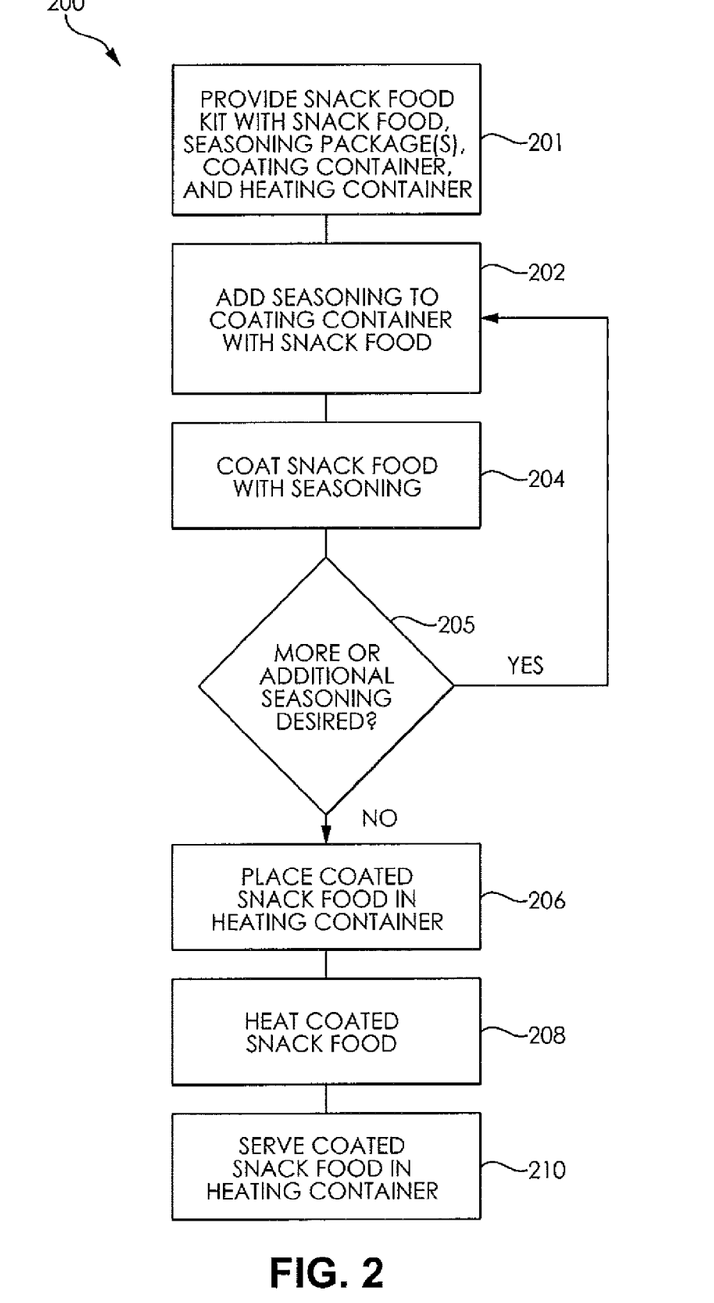
FIG. 2 is a flow diagram of a method for preparing a custom flavored snack food according to another embodiment of the present disclosure.
Figure 5:
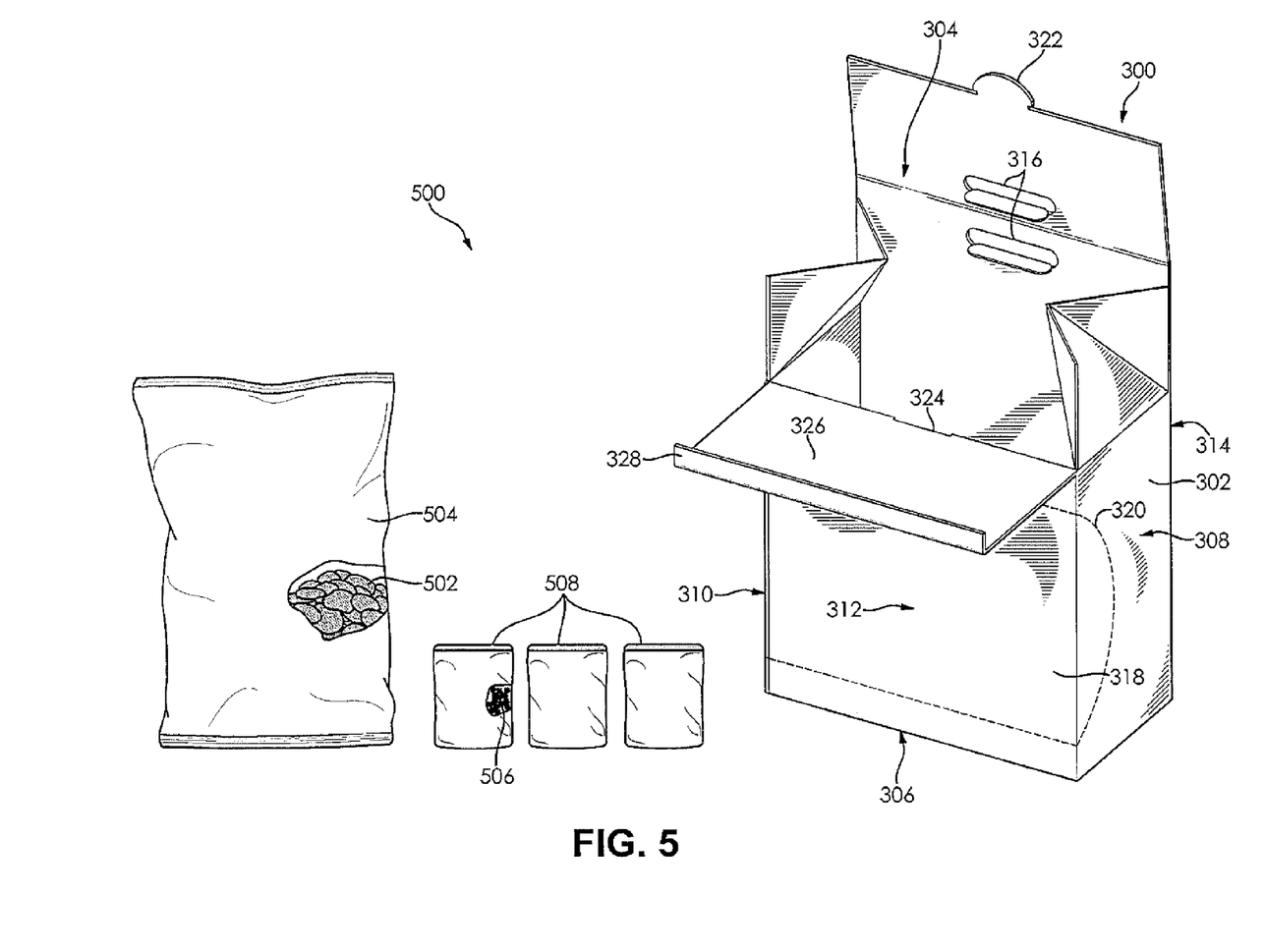
FIG. 5 is a rear perspective view of the heating container illustrated in FIGS. 3-4, the top of the heating container shown fully opened and provided alongside the snack food kit that may be packaged in the heating container, with individual packages of the snack food kit shown in fragmentary side perspective view so that the contents of the individual packages are shown.
Figure 6:
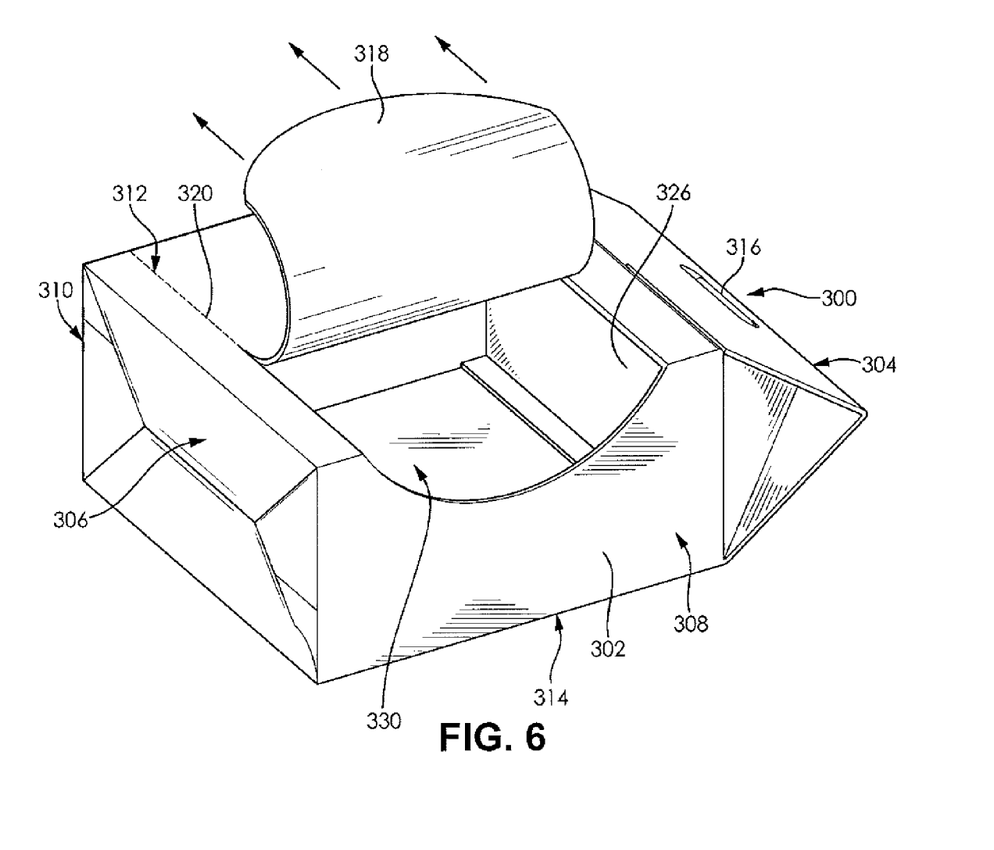
FIG. 6 is a side perspective view of the heating container illustrated in FIGS. 3-5, shown with a removable panel partially removed to expose a heating cavity of the heating container.

FIGS. 1-2 depict a method 100, 200 for preparing a custom flavored snack food according to particular embodiments of the present disclosure. In certain embodiments, the method 100, 200 may be conducted using a snack food kit 500 as shown in FIG. 5, for example, including a snack food 502, a coating container 504, and at least one seasoning powder 506. The method 100 may alternatively be conducted with each of the snack food 502, the coating container 504, and the at least one seasoning powder 506 being independently provided.

As shown in FIG. 1, the method 100 first includes a combining step 102 in which a quantity of the snack food 502 and the seasoning powder 506 are combined in the coating container 504. The snack food 502 is at least partially cooked. In particular embodiments, the snack food 502 is fully cooked prior to the combining step 102. As nonlimiting examples, the snack food 502 may include one of potato chips, pretzels, and crackers. In other examples, the snack food 502 may be tortillas, popcorn, pork rinds, crisps, or an extruded snack such as a puff or a pop. One of ordinary skill in the art may select other types of the snack food 502 for use with the method 100, as desired.

The at least one seasoning powder 506 may include a base seasoning powder. The base seasoning powder may provide a desired basic flavoring for the custom flavored snack food. For example, where the desired basic flavoring is pizza, the base seasoning powder may provide flavoring associated with cheese pizza. The at least one seasoning powder 506 may also include at least one topping seasoning powder different from the base seasoning powder. The topping seasoning powder is adapted to compliment the desired basic flavoring, and provide a consumer with the ability to fully customize the flavoring of the custom flavored snack food to a desired taste. For example, where the desired basic flavoring is pizza, the topping seasoning powder may provide complimentary flavoring associated with pizza toppings such as pepperoni, sausage, mushrooms, peppers, etc. It should be understood that the usage of both the base seasoning powder and at least one topping seasoning powder allows the consumer to create a multitude of customized flavors. Other types of base seasoning powders and topping seasoning powders may also be used within the scope of the disclosure, The coating container 504 in which the snack food 502 and the at least one seasoning powder 506 are combined may be a bag in which the snack food 502 is initially provided, for example. The bag may be formed from a plastic, a metalized material, or a non-metalized material, as examples. Alternatively, the coating container 504 may be a separate bowl or a pan in which the snack food 502 and the at least one seasoning powder 506 are combined, A skilled artisan may select other types of receptacles for use as the coating container 504, as desired.

Following the combining step 102, the method 100 includes a coating step 104 in which the snack food 502 is thoroughly coated with the at least one seasoning powder 506. The coating step 104 may include a shaking of the snack food 502 and the seasoning powder 506 inside the coating container 504.

The snack food 502 has a structural integrity sufficient to minimize a breakage of the snack food 502 when shaken in the coating container 504. The snack food 502 may also have a shape that facilitates the coating and retaining of the at least one seasoning powder 506 on the snack food 502. For example, where the snack food 502 is potato chips, the potato chips may be marcelled or wavy in order to provide both the structural integrity during the manual shaking, and an optimum level of coating with the at least one seasoning powder 506 during the manual shaking of the coating container 504. Other means for coating the snack food 502 with the at least one seasoning powder 506 may also be used within the scope of the disclosure.

In a step 106, the coated snack food 502, 506 may be placed in a heating container 300 (shown in FIGS. 3-8). Where it is desired to use a microwave oven, the heating container 300 is microwave safe, such as a box formed from a paper board material. Other microwave safe materials may also be used. Where it is desired to use a conventional oven, the heating container 300 may include one of a pan and a sheet, as nonlimiting examples.

Figure 7:
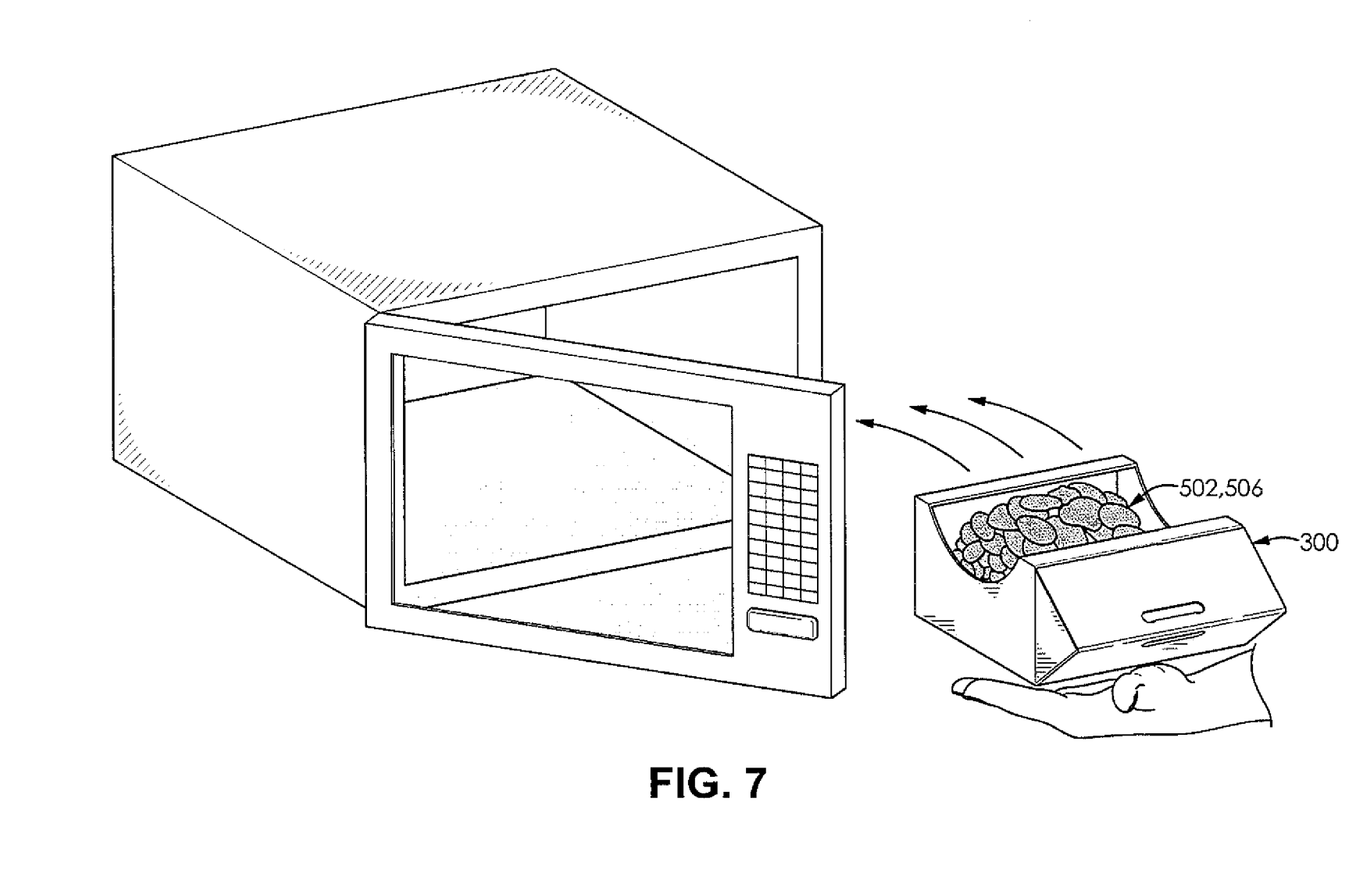
FIG. 7 is a side perspective view of the heating container illustrated in FIGS. 3-6, having a coated snack food disposed in the heating cavity and being inserted into a microwave oven for preparation according to a method of the present disclosure.

The method 100 further includes a heating step 108 in which the snack food 502 coated with the at least one seasoning powder 506 is heated to a predetermined temperature for a predetermined time to form the custom flavored snack food. The heating step 108 may be performed by inserting the heating container 300 with the coated snack food 502, 506 into one of the microwave oven and the conventional oven, for example, as shown in FIG. 7.

During the heating step 108, oil in the snack food 502 is caused to rise to the surface of the snack food 502. The oil intermixes with the seasoning powder 506 and causes the seasoning powder 506 to be at least partially absorbed by the snack food 502 as the oil is absorbed back into the snack food 502 when cooling. Advantageously, the snack food 502 itself thereby takes on the flavor of the seasoning powder 506, and becomes more than just a coated product due to the heating step 108. In a particular example, the oil used is a non-trans fat cottonseed oil. Other types of oils may also be used. The oil type and content of the snack food 502 may be controlled so that the custom flavored snack food ultimately produced by the heating step 108 is hot and crispy, and will sufficiently absorb the flavor of the seasoning powder 506. A skilled artisan will appreciate that there are different cook times and temperatures for the various varieties of known cooking oils that may be appropriate to cause the oil to rise to the surface of the snack food 502. The appropriate cook times/temperatures may be selected based on the oil type and content, as desired.

The predetermined temperature and the predetermined time of the heating step 108 are selected based upon the type and oil content of the snack food 502 employed. The predetermined temperature and time are selected to ensure sufficient absorption of the flavor of the seasoning powder 506 into the snack food 502. In particular embodiments, the predetermined temperature to which the snack food 502 is heated may be between about 300° F. and about 400° F., more particularly between about 325° F. and 375° F., and most particularly about 350° F. The predetermined time may particularly be from about 30 seconds to about 10 minutes, more particularly from about 1 minute to about 7 minutes, and most particularly from about 3 minutes to about 5 minutes. Other suitable temperatures and times may also be used. One of ordinary skill in the art may select a suitable predetermined time for the heating step 108, depending on the predetermined temperature also selected.

Figure 8:
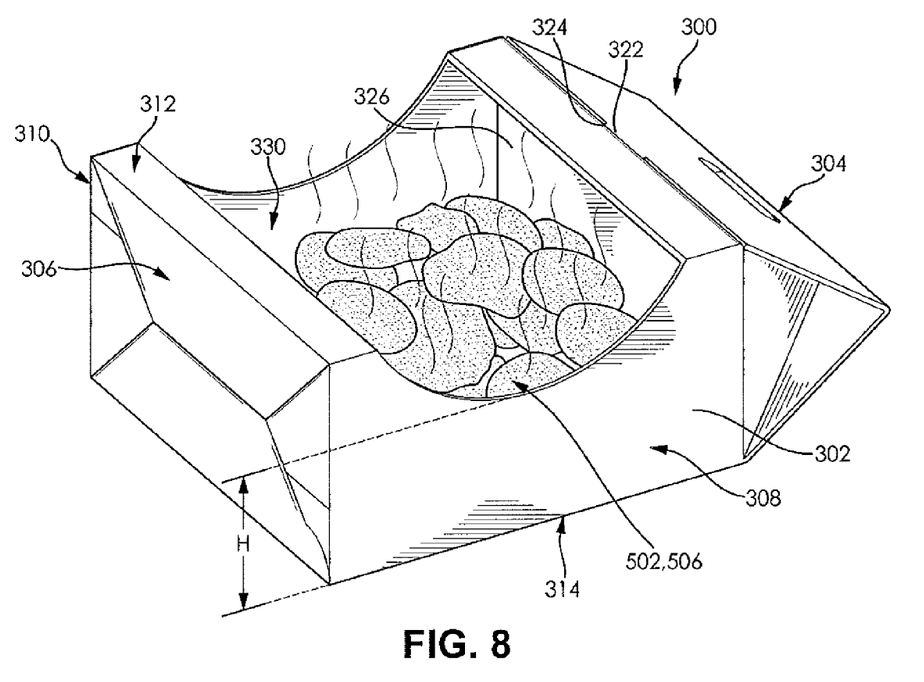
FIG. 8 is a side perspective view of the heating container illustrated in FIGS. 3-7, having a custom flavored snack food product prepared by heating the coated snack food according to a method of the present disclosure.

The custom flavored snack food is provided by the heating of the snack food 502 and the at least one seasoning powder 506 in the heating step 108. Subsequently, the custom flavored snack food may be served in a serving step 110. In the serving step 110, the custom flavored snack food may be transferred to a bowl or plate for the consumer to enjoy. In other embodiments, for example, as shown in FIG. 8, the custom flavored snack food may be served in the heating container 300 in which the custom flavored snack food was heated. Alternatives for serving the custom flavored snack food may also be used, as desired.

Referring now to FIG. 2, the method 200 of the present disclosure may include additional steps related to the provision of the snack food kit 500 and the coating of the snack food 502 with the seasoning powder 506. Although the snack food kit 500 "comprising" the listed items is described, the snack food kit "consisting essentially of" or "consisting of" the listed ingredients is also within the scope of the disclosure. Like or related steps to those shown in FIG. 1 are identified in FIG. 2 with the same reference numbers, but in a 200-series, for the purpose of clarity.

The method 200 may begin with a snack food kit step 201, including a provision of the kit 500 for preparing the snack food 502. As shown in FIG. 5, the kit 500 includes the quantity of the snack food 502 that is at least partially cooked, at least one package 508 of the at least one seasoning powder 506, the coating container 504 for manually coating the snack food 502 with the at least one seasoning powder 506, and the heating container 300. In addition to being configured for the eventual heating of the coated snack food 502, 506, the heating container 300 is configured to hold the snack food 502, the at least one package 508 of the at least one seasoning powder 506, and the coating container 504 when provided as the kit 500.

Like the method 100, the method 200 shown in FIG. 2 also includes the combining step 202 and the coating step 204. The snack food 502 and the at least one seasoning powder 506 are combined in the coating container 504 during the combining step 202. The snack food 502 is thoroughly coated with the at least one seasoning powder 506 during the coating step 204.

Furthermore, the method 200 may include a decision point 205, in which it is determined whether more or additional seasoning powder 506 is desired. If the more or additional seasoning powder 506 is desired after the coating step 204, the more or additional seasoning powder 506 may be added by repeating the combining step 202 and the coating step 204. The combining step 202 and the coating step 204 may be repeated as many times as necessary to provide the custom flavored snack food.

In illustrative embodiments, the at least one seasoning powder 506 may be incrementally added to the snack food 502. It has been surprisingly found that the incremental addition of the at least one seasoning powder 506 in the combining step 202, and repeating the combining step 202 and the coating step 204 more than once, provides a more thorough coating of the snack food 502. For example, the at least one seasoning powder 506 may be added in one-third increments during initial and repeated combining steps 202 and coating steps 204. The steps of placing the snack food in the coating container 504 with the at least one seasoning powder 506, and coating the snack food 502 with the at least one seasoning powder 506, may be repeated until the snack food 502 is coated with the desired amount of the seasoning powder 506.

The heating step 208 of the method 200 is preceded by the step 206 of placing the coated snack food 502, 506 in the heating container 300. The heating container 300 may then be disposed in one of the microwave oven and the conventional oven, for example, as shown in FIG. 7. Following the heating step 208 where the custom flavored snack food is formed, the custom flavored snack food may be served to the consumer in the serving step 210. Advantageously, the custom flavored snack food may be served in the heating container 300 itself, as shown in FIG. 8. Other means for serving the custom flavored snack food may also be used, as desired.

Figure 3:
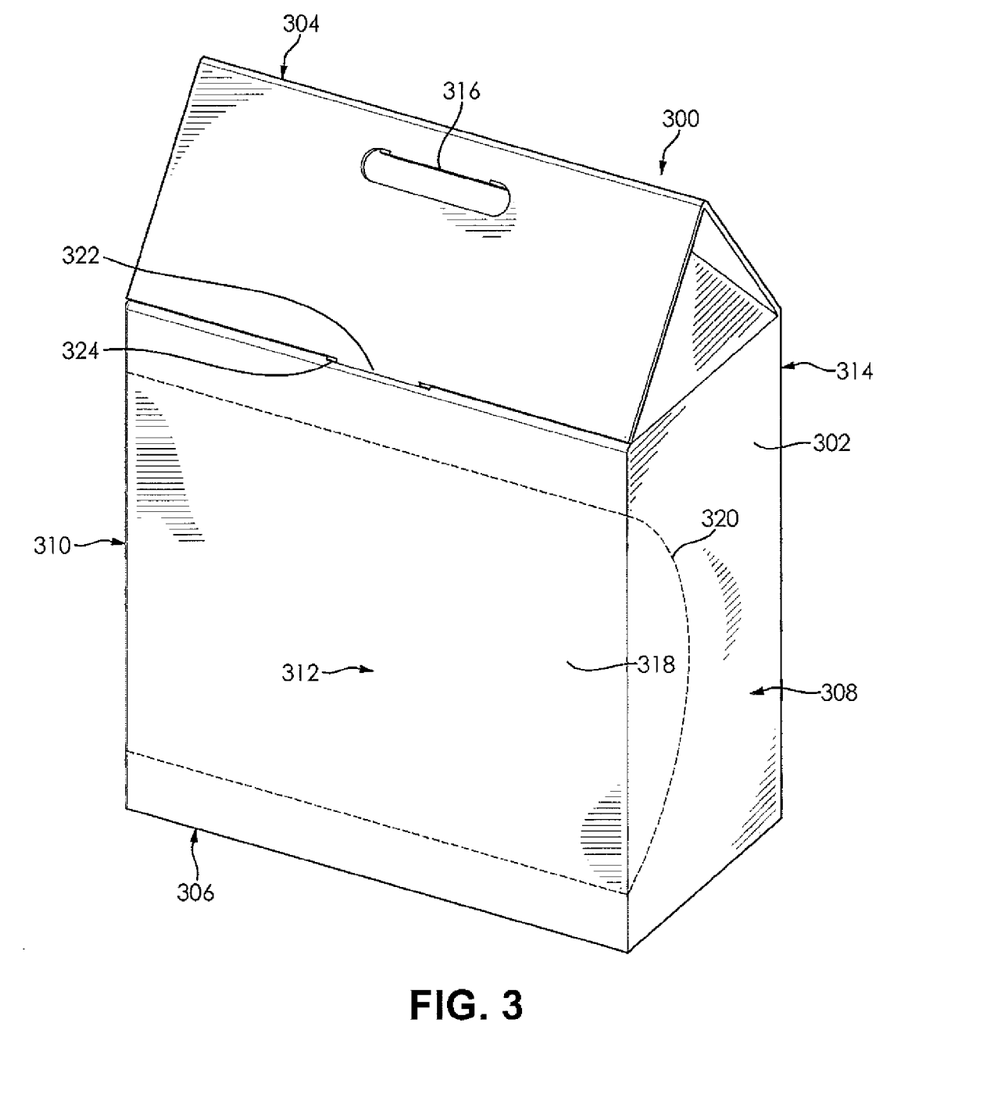
FIG. 3 is a rear perspective view of a heating container for packaging a snack food kit and preparing a custom flavored snack food according to an embodiment of the present disclosure, a top of the heating container shown closed.
Figure 4:
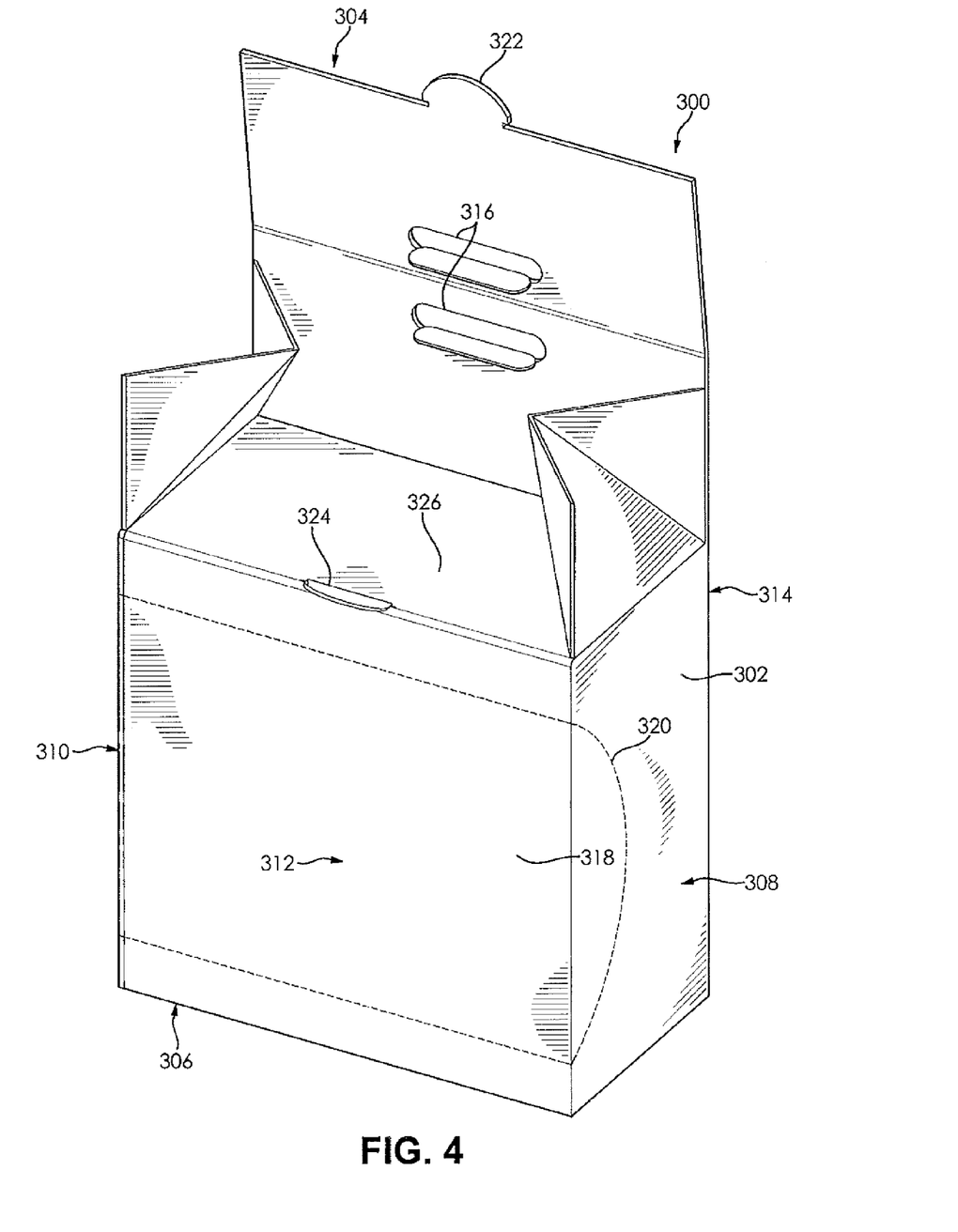
FIG. 4 is a rear perspective view of the heating container illustrated in FIG. 3, the top of the heating container shown partially opened.

Referring now to FIGS. 3-5, the heating container 300 for preparing the custom flavored snack food includes a main body 302 that is at least one of microwaveable and oven-safe in order to heat the snack food 502 coated with the at least one seasoning powder 506. The main body 302 is able to withstand heating to the predetermined temperature for the predetermined time to form the custom flavored snack food, without significant degradation or compromising the integrity and taste of the custom flavored snack food. As nonlimiting examples, the main body 302 may be formed from paper board or card board. In other nonlimiting examples, the main body 302 may be formed from a food-safe plastic or composite material. A skilled artisan understands that other materials that are at least one of microwaveable and oven-safe may also be used for the main body 302.

Advantageously, and as described further above, the heating container 300 may be used to hold each of the snack food 502, the coating container 504, the at least one seasoning powder 506, and the at least one package 508 for the at least one seasoning powder 506 when provided as the kit 500. The main body 302 of the heating container 300 may be a box having a top 304, a bottom 306, a rear 312, a front 314, and a pair of sides 308, 310. The sides 308, 310 are disposed between the rear 312 and the front 314 of the main body 302.

In particular embodiments, the main body 302 includes a handle 316 disposed at the top 304 of the main body 302. The handle 316 permits the consumer to easily carry the kit 500. As a nonlimiting example, the handle 316 may be defined by elongate holes formed in a tent at the top 304 of the main body 302. The elongate holes may be punched out of the tent, for example. In other embodiments, the handle 316 may be a substantially U-shaped handle affixed to one of the top 304 and the sides 308, 310 of the main body 302. Other types of handles 316 on the main body 302 may also be used.

The heating container 300 also has a removable panel 318 disposed on one of the rear 312 and the front 314 of the main body 302. When removed, the removable panel 318 provides access to a heating cavity 330 of the heating container 300. The heating cavity 330 is configured to receive the snack food 502 coated with the at least one seasoning powder 506. A food safe, paper- or plastic-based liner may be provided in the heating cavity 330, if desired.

In certain embodiments, the removable panel 318 is defined by perforations 320 in the one of the rear 312 and the front 314 of the main body 302. The perforations 320 may also be disposed on a portion of sides 308, 310 of the main body 302. The perforations 320 may provide the heating cavity 330 with an arcuate edge on each of the sides 308, 310, as shown in FIGS. 3-8. The perforations 320 may also define a finger hold for the consumer to use to begin peeling back the removable panel 320 from the main body 302. Other edge shapes of the heating cavity 330 defined by the perforations 320 may also be used.

It has unexpectedly been found that having the removable panel 318 disposed partly on each of the sides 308, 310 militates against an improper heating of the snack food 502 in the heating container 300. A minimum height H of each of the sides 308, 3120 may be selected, as desired, to militate against the improper heating while also retaining the snack food 502. In a particular embodiment, having the removable panel 318 disposed on each of the sides 308, 310, so that the minimum height H of each of the sides 308, 310 is approximately half a total height of the main body 302, has been shown to militate against the improper heating. The appropriate height H retains the snack food 502 while also militating against a burning of the snack food 502 when the heating container 300 is heated.

The top 304 of the main body 302 may be selectively opened, and the bottom 306 of the main body 302 may be normally closed and not adapted for opening. In particular embodiments, the tent at the top 304 of the main body 302 may have a tab 322 that selectively cooperates with a slot 324 in the main body 302 to hold the top 304 of the main body 302 closed. When the heating container 300 is provided as part of the kit 500, and the top 304 is opened, contents of the main body 302 such as the snack food 502, the coating container 504, the at least one seasoning powder 506, and the at least one package 508 for the at least one seasoning powder 506, may be pulled from the interior of the main body 302 for use in the method of the present disclosure. It should be understood that the top 304 may be closed after the contents are removed. Other means for selectively opening and closing the top 304 may also be used, as desired.

As shown in FIGS. 4-6 and 8, the heating container 300 may further include a partition wall 326. The partition wall 326 is coupled to one of the rear 312 and the front 314 of the main body 302, and disposed between the tent and the heating cavity 330 to militate against the burning of the snack food 502 when heated. In particular, the partition wall 326 prevents the snack food 502 from inadvertently being disposed in the tent at the top 304 of the main body 302. The partition wall 326 may also have a foldable end portion 328 that is configured to abut an inside of the main body 302 to seal the heating cavity 330 from the tent where the handle 316 is formed.

EXAMPLES

Although the following examples are provided with respect to custom flavored potato chips, it should be understood that other types of snack food 502 including pretzels, crackers, and the like may be substituted for potato chips. The other types of snack food may likewise be provided with a customized flavor using at least one of the method 100, 200, the kit 500, and the heating container 300 of the present disclosure.

Container/Design—Heating Container/Kit Box Specifications

The heating container 300, also referred to as a "kit box", is made of microwave and food safe paperboard. The kit box has full color print with microwave and food safe inks. The kit box has the "tent-like" top 304 for aesthetic appeal. The handle 316 is provided on the top 304 of the kit box for easy carrying. The partition wall 326 is provided to close-off the top 304 and to help prevent burning of the potato chips by prohibiting the potato chips from entering the tent area. The kit box also has a perforated, removable panel 318, also referred to as a "tear-out", in the rear 312 and the sides 308, 310 of the main body 302 to allow the kit box to be used as a microwavable tray. The position of the tear-out is maximized in height and extends into approximately ½ of the depth (on the sides 308, 310) for at least two purposes. First, the perforation 320 needs to be high enough to prevent potato chips from falling out of the kit box. Second, the perforation 320 needs to be low enough to prevent potato chips from burning. The tab 322 used to close the rear 312 of the main body 302 has side tear-outs to help prevent the tab 322 from tearing when opened. This feature is important because the consumer needs to close the kit box after opening it in order to utilize the kit box as a microwavable tray. It should be appreciated that utilizing the kit box as a microwavable tray eliminates the need for a cooking dish, saving the consumer time in preparation and clean-up. The size of the kit box is designed to fit into most conventional microwave ovens.

Kit—Kit Specifications

The kit includes a kit box as described above, a 7 oz bag of pre-cooked wavy potato chips, and multiple seasoning packets. The potato chips are precooked through standard manufacturing processes on a continuous cooking line, or potentially other types of processes such as batch, baked, kettle, etc. The potato chips may be salted or salt-free, as desired. The potato chips are then packaged into the individual 7 oz bags, The potato chips may be packaged in a metallized or non-metallized bag suitable for potato chips. The bags are engineered to minimize oxygen and sunlight permeation that causes the potato chips to oxidize, or stale.

Multiple packets of seasoning are included to allow the consumer to completely customize their seasoning. Initially included is a base seasoning, with two additional "topping" seasonings to add unique flavoring to the base seasoning. The multiple seasoning packets may include: 1) 3 tbsp packet of base seasoning (e.g., cheese pizza in the pizza flavored kit); 2) ½ tbsp packet of topping seasoning #1 (e.g., pepperoni in the pizza flavored kit); and 3) ½ tbsp packet of topping seasoning #2 (e.g., sausage in the pizza flavored kit). The base seasoning may stand alone as the only seasoning, or the topping seasonings may be added for countless combinations. The seasoning is manufactured through a standard, but separate manufacturing process and packaged into individual, metallized or non-metallized packets.

It should be understood that different bag sizes and seasoning package sizes, from individual to bulk (e.g., 1 oz to 16+ oz), may be used. For example, a 16 oz bulk seasoning package for a catering company or a package of multiple 1 oz bags for a school project can be used. Different exterior packaging (e.g., seasoning packets inside of the bag of chips) is also contemplated.

Flavors—Seasoning Powder Specifications

The following non-exhaustive listing of flavor possibilities are contemplated:
a) Loaded Cheese Fries; b) Pizza; c) Adult Beverage; d) Holiday Themed; e) Sweet; f) Cinnamon Roll; g) Brown Sugar Streusel; h) Apple Streusel; i) Pumpkin Pie; j) Ethnic; k) Wasabi & Ginger; l) Chili Thai; m) Cilantro Lime Mexicana; n) Mediterranean; o) Greek; p) Hot; q) Hot Wings and Bleu Cheese; r) Smokin' Hot; s) Sweet & Hot; and t) Jalapeno & Cheese. Other flavor possibilities are also within the scope of the present disclosure.

Method—Basic Instructions

Oven Instructions:

Preheat the oven to 350° F. The temperature of at least about 350° F. has been shown to be optimal, as temperatures below 350° F. may not heat the potato chips enough for the oil in the potato chips to rise to the surface and intermingle with seasonings. In a separate bowl, mix together the desired seasonings. Multiple recipes may be provided on the sides 308, 310 of the kit box. There are countless seasoning combinations, allowing the consumer to "be the chef." Ingredients from home can be added as well (e.g., basil and/or parmesan may be added to the pizza flavored kit for an authentic pizzeria taste). Open the bag of potato chips. Add one third of the customized seasoning. It is important that the seasoning is added in increments to facilitate even distribution of the seasoning on the potato chips. Fold the top of the bag to secure the potato chips and gently shake back and forth. Add another third and repeat. The incremental coating is repeated until all seasoning is gone, or until a desired amount of seasoning is coated on the potato chips. Empty the seasoned potato chips onto an oven safe pan. A covering such as aluminum foil may be placed over the seasoned potato chips. Other types of oven safe coverings may also be used. It has surprisingly been found that the covering allows the potato chips to cook for a longer period of time without burning. Use of the covering may therefore be preferred for optimum heating. Where the seasoned potato chips are covered, bake the seasoned potato chips for two (2) to fourteen (14) minutes, and preferably for eight (8) minutes, at an oven temperature of 350° F. Where the seasoned potato chips are uncovered, an optimal cooking time may be shorter, for example, between about 2-½ minutes and 3 minutes. In particular, cooking times above about 3 minutes, when the product is unheated, have been shown to burn the potato chips. The heating of the seasoned potato chips is imperative to the uniquely, fresh taste of the product. The seasoned potato chips may then be enjoyed. If they cannot be eaten all in one sitting, the seasoned potato chips may be placed back in the bag, closed with a clip, and reheated and enjoyed later. It has been surprisingly found that covering the potato chips also allows the potato chips to remain in the oven on "warm", for example, about 170° F. for approximately one hour, and still maintain the original products integrity and flavor.

Microwave Instructions:

Open the top 304 of the kit box and remove the contents from the kit box. Close the top 304 of the box. In a separate bowl, mix together the desired seasonings. Multiple recipes may be provided on the sides 308, 310 of the kit box. There are countless seasoning combinations, allowing the consumer to "be the chef." Ingredients from home can be added as well (e.g., basil and/or parmesan may be added to the pizza flavored kit for an authentic pizzeria taste). Open the bag of potato chips. Add one third of the customized seasoning. It's imperative that the seasoning is added in increments to facilitate even distribution of the seasoning on the potato chips. Fold the top of the bag to secure the potato chips and gently shake back and forth. Add another third and repeat. The incremental coating is repeated until all seasoning is gone, or until a desired amount of seasoning is coated on the potato chips. Remove the perforated tear-out on the rear 312 and sides 308, 310 of the kit box. Empty the seasoned potato chips into the opened kit box. As one option, microwave the seasoned potato chips for 50-80 seconds on power level 7. As another option, microwave the seasoned potato chips on "Hi/Cook" for about 40 seconds, stir the product, and cook again 30-50 seconds. This option eliminates the potential burning of the product if the consumer forgets or doesn't know how to change the power level setting. Stirring the product mid-cook time also promotes even heat distribution and helps to prevent burning. The length of this cook time may be increased or decreased by about 10 seconds, if desired. The heating of the seasoned potato chips is imperative to the uniquely, fresh taste of the product. The seasoned potato chips may then be enjoyed. If they cannot be eaten all in one sitting, the seasoned potato chips may be placed back in the bag, closed with a clip, and reheated and enjoyed later.

It should be appreciated that the method 100, 200, the kit 500, and the container 300 of the present disclosure advantageously permits the preparation flavored snack foods, easily customized to the individual tastes of the consumer.

While certain representative embodiments and details have been shown for purposes of illustrating the invention, it will be apparent to those skilled in the art that various changes may be made without departing from the scope of the disclosure, which is further described in the following appended claims.

What is claimed is:

1. A method for preparing a custom flavored snack food, the method comprising the steps of:
providing a kit for preparing the custom flavored snack food, including a quantity of a snack food that is pre-cooked with oil, the snack food having an oil content following the pre-cooking with the oil, at least one package of at least one seasoning powder, a coating container for manually coating the snack food with the at least one seasoning powder, and a heating container configured to hold the snack food, the at least one package of seasoning powder, and the coating container, the heating container also configured to receive the snack food coated with the at least one seasoning powder for heating the snack food coated with the at least one seasoning powder to a predetermined temperature for a predetermined time to form the custom flavored snack food, wherein the heating container includes a main body with a front, a rear, a pair of opposing sides each connecting the front and the rear, a bottom connecting the front, the rear and the opposing sides, a handle defined by a hole in a tent at a top of the main body and configured for carrying the kit, and a removable panel that provides access to a heating cavity of the heating container for receiving the snack food when coated with the seasoning powder, the removable panel disposed across a major portion of a length of one of the front and the rear of the main body and partly on the opposing sides of the main body, and a partition wall coupled to one of the rear and the front and selectively disposed between the tent and the heating cavity to seal the heating cavity from the tent, wherein the removable panel extends to approximately one half a height of each of the sides, and the heating cavity is defined by the front, the rear, the bottom, the opposing sides, and the partition wall of the main body, the heating cavity exposed at one of the front and the rear of the main body upon removal of the removable panel;

placing the snack food in one of the heating container and the coating container with the at least one seasoning powder;

coating the snack food with the at least one seasoning powder by shaking the one of the heating container and the coating container with the snack food and the at least one seasoning powder; and heating the snack food coated with the at least one seasoning powder in the heating container to the predetermined temperature for the predetermined time to form the custom flavored snack food, wherein the oil content of the snack food is sufficient for the oil to rise to the surface of the snack food and intermingle with the at least one seasoning powder during the heating of the snack food coated with the at least one seasoning powder, and to at least partially absorb the at least one seasoning powder back into the snack food during the cooling of the snack food coated with the at least one seasoning powder, to thereby cause the snack food to take on the flavor of the at least one seasoning powder.

2. The method of claim 1, wherein the snack food is one of potato chips, pretzels, crackers, popcorn, tortillas1 pork rinds, crisps, and extruded snacks.

3. The method of claim 1, wherein the snack food is fully cooked prior to the step of coating the snack food with the at least one seasoning powder.

4. The method of claim 1, wherein the at least one seasoning powder includes a base seasoning powder and at least one topping seasoning powder different from the base seasoning powder.

5. The method of claim 1, wherein the coating container is a bag in which the snack food is initially provided.

6. The method of claim 1, wherein the at least one seasoning powder is incrementally added to the snack food and the steps of placing the snack food in the coating container with the at least one seasoning powder and coating the snack food with the at least one seasoning powder are repeated until the snack food is coated with a desired amount of the seasoning powder.

7. The method of claim 6, wherein the at least one seasoning powder is added in one-third increments during an initial and repeated steps of placing the snack food in the coating container with the at least one seasoning powder.

8. The method of claim 1, wherein the step of coating the snack food with the at least one seasoning powder includes a shaking of the snack food and the at least one seasoning powder inside the coating container.

9. The method of claim 1, wherein the predetermined temperature is between about 300° F. and about 400° F., and the predetermined time is from about 30 seconds to about 10 minutes.

10. The method of claim 1, wherein the step of heating the snack food includes the steps of placing the coated snack food in the heating container and disposing the heating container in one of a microwave oven and a conventional oven.

11. A kit for preparing a custom flavored snack food, comprising:
a quantity of a snack food that is pre-cooked with oil, the snack food having an oil content following the pre-cooking with the oil;
at least one package of at least one seasoning powder;
a coating container for manually coating the snack food with the at least one seasoning powder; and
a heating container configured to hold the snack food, the at least one package of seasoning powder, and the coating container, the heating container also configured to receive the snack food coated with the at least one seasoning powder for heating the snack food coated with the at least one seasoning powder to a predetermined temperature for a predetermined time to form the custom flavored snack food, wherein the heating container includes a main body with a front, a rear, a pair of opposing sides each connecting the front and the rear, a bottom connecting the front, the rear and the opposing sides, a handle defined by a hole in a tent at a top of the main body and configured for carrying the kit, a removable panel that provides access to a heating cavity of the heating container for receiving the snack food when coated with the seasoning powder, the removable panel disposed across a major portion of a length of one of the front and the rear of the main body and partly on the opposing sides of the main body, and a partition wall coupled to one of the rear and the front and selectively disposed between the tent and the heating cavity to seal the heating cavity from the tent, wherein the removable panel extends to approximately one half a height of each of the sides, and the heating cavity is defined by the front, the rear, the bottom, the opposing sides, and the partition wall of the main body, the heating cavity exposed at one of the front and the rear of the main body upon removal of the removable panel;
wherein the oil content of the snack food is sufficient for the oil to rise to the surface of the snack food and intermingle with the at least one seasoning powder during the heating of the snack food coated with the at least one seasoning powder, and to at least partially absorb the at least one seasoning powder back into the snack food during the cooling of the snack food coated with the at least one seasoning powder, to thereby cause the snack food to take on the flavor of the at least one seasoning powder.

12. The kit of claim 11, wherein the coating container is a bag in which the snack food is disposed.

13. The kit of claim 11, wherein the heating container is at least one of microwaveable and oven-safe in order to heat the snack food after being coated with the seasoning powder to a predetermined temperature for a predetermined time to form the custom flavored snack food.

* * * * *